United States Patent
Gneuss

(10) Patent No.: US 7,976,706 B2
(45) Date of Patent: Jul. 12, 2011

(54) MELT FILTER

(75) Inventor: Detlef Gneuss, Bad Oeynhausen (DE)

(73) Assignee: Gneuss Kunststofftechnik GmbH, Bad Oeynhausen (DE)

( * ) Notice: Subject to any disclaimer, the term of this patent is extended or adjusted under 35 U.S.C. 154(b) by 255 days.

(21) Appl. No.: 12/302,885

(22) PCT Filed: Nov. 23, 2007

(86) PCT No.: PCT/EP2007/010201
§ 371 (c)(1),
(2), (4) Date: Nov. 30, 2008

(87) PCT Pub. No.: WO2008/064833
PCT Pub. Date: Jun. 5, 2008

(65) Prior Publication Data
US 2010/0206794 A1  Aug. 19, 2010

(30) Foreign Application Priority Data

Nov. 28, 2006 (DE) .......................... 10 2006 056 471

(51) Int. Cl.
*B01D 29/50* (2006.01)
*B29C 47/68* (2006.01)
(52) U.S. Cl. .................. 210/232; 210/325; 425/199
(58) Field of Classification Search .......... 210/232, 210/324, 325, 359; 425/197, 199
See application file for complete search history.

(56) References Cited

U.S. PATENT DOCUMENTS

| | | | | |
|---|---|---|---|---|
| 3,817,377 A | | 6/1974 | Piggott | 210/767 |
| 4,511,472 A | * | 4/1985 | Trott | 210/340 |
| 5,090,887 A | * | 2/1992 | Gneuss | 425/185 |
| 5,449,458 A | | 9/1995 | Gneuss | 210/330 |
| 6,325,922 B1 | * | 12/2001 | Schaller et al. | 210/90 |
| 6,843,915 B2 | * | 1/2005 | Gneuss | 210/330 |
| 7,411,163 B2 | * | 8/2008 | Gneuss | 219/497 |
| 2008/0179261 A1 | * | 7/2008 | Patrovsky | 210/767 |

FOREIGN PATENT DOCUMENTS

DE  10254022 A1 * 3/2004
WO  WO-2005056273  6/2005

* cited by examiner

*Primary Examiner* — Fred Prince
(74) *Attorney, Agent, or Firm* — Andrew Wilford

(57) ABSTRACT

A melt filter, for the purification of plastic melts, particularly dispensed from extruders, comprises a housing (1) with a melt channel (10), connecting a melt inlet (7) to a melt outlet (9), with a sieve disc (5), which may be rotated by a motorized ratchet drive provided in the melt channel (10), comprising recesses separated by ridges in a circular track for housing exchangeable filter elements and the housing (1) has a filter element changing station (13). The aim of the invention is that the above shall be designed such that large amounts of melt for filtering can be filtered in a cost-effective energy saving and space saving manner. The above is achieved by means of the housing comprising at least two melt inlets (7, 8) connected to the melt outlet (9) by at least two melt channels (10, 11) and in each melt channel (10, 11) a sieve disc (5, 6) driven on rotation by a motorized ratchet drive is provided and each sieve disc (5, 6) is provided with a filter element exchange station (13, 15).

8 Claims, 1 Drawing Sheet

MELT FILTER

CROSS REFERENCE TO RELATED APPLICATIONS

Figure 1:
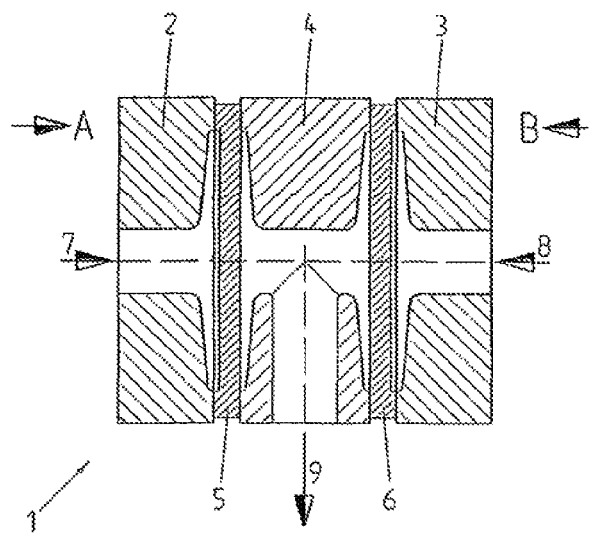

This application is the US national phase of PCT application PCT/EP2007/010201, filed 23 Nov. 2007, published 5 Jun. 2008 as WO2008/064833, and claiming the priority of German patent application 102006056471.5 itself filed 28 Nov. 2006, whose entire disclosures are herewith incorporated by reference.

The invention relates to a melt filter for cleaning of plastic melts discharged in particular from extruders, with a housing comprising a melt conduit connecting a melt inlet and a melt outlet, in which melt conduit a sieve disk is provided and arranged that can be rotated by a motorized ratchet drive, that is formed with recesses separated along a circular track by webs for receiving exchangeable filter sieves, and that has a filter element changing station.

Such melt filters belong to the state of the art, e.g. by DE 103 58 672 [WO 2005/056273]. If large amounts of melt are to be purified, the filter elements of the sieve disks reach their limits as regards their structural size. The filter elements must resist the pressure of the plastic melt supplied from the extruder. They cannot be enlarged as desired since they would also have to be thicker as the filter surface increases in order to be able to resist the pressure. In the filter elements currently on the market for such sieve disks the ratio of the sieve surface to the sieve thickness is optimized. If more than the maximally possible amount of plastic melt is to be filtered, a second or more melt filters must be provided. The further melt filters are expensive and, in addition, require considerable space, as well as further controls, further energy, etc.

The object of the invention is to provide a generic melt filter wherein large amounts of melts to be filtered can be filtered economically and in an energy-saving and space-saving manner.

In order to attain this object, it is suggested that the housing comprises at least two melt inlets connected via at least two melt conduits to the melt outlet, and that a sieve disk that can be rotated by at least one motorized ratchet drive is provided in each melt conduit and that a filter element changing station is associated with each sieve disk.

A very large amount of the melt to be filtered can be filtered by multiplying the melt inlets and the sieve disks arranged behind them without requiring significantly more space for the housing, the control and the filter element changing station. In addition, the compact construction ensures that hardly more energy is required than in the generic melt filter and is significantly less energy than when using a number of generic melt filters for heating the filter.

It is advantageous that the housing comprises two inlet blocks and one outlet block and that a sieve disk is arranged between the two inlet blocks and the outlet block and that the melt conduit of the inlet blocks widens out from the melt inlet toward the sieve disk.

In contrast to using of several melt filters, at least two inlet blocks can be arranged on only one outlet block in this compact filter, so that if two inlet blocks and two sieve disks are provided at least one outlet block is saved, which saves space as well as expense.

If the sieve disks in the housing are arranged substantially parallel to each other, this results in especially favorable conditions of space and pressure.

Although each sieve disk can of course have its own ratchet drive, it is especially advantageous if the ratchets driving the sieve disks have a common ratchet drive. As a result, only one controller is necessary for the drive of both sieve disks. In addition, one drive device is saved, which can minimize system costs.

It is noteworthy that at least one backflow conduit is provided for each sieve disk in the outlet block, branched off from the outlet-melt conduit, and that backflow outlets located opposite the backflow conduit are arranged in the inlet blocks.

The changing intervals of the filter elements can be significantly increased by providing a backflow possibility for each of the sieve disks.

It is worthy of imitation that each inlet block completely covers the sieve disk bordering on it, which covering is interrupted only by the filter element changing station.

Due to the approximately complete covering of the sieve disks, as little air as possible reaches the sieve disks, so that the plastic has hardly any chance of cracking.

If the filter element changing stations can be closed by flaps, even less air can reach the sieve disks. The opening intervals of the flaps can be enlarged by the possibility of backflow.

Each filter element changing station is advantageously larger than a filter element but smaller than or equally as large as the size of two filter elements.

This selected size of the filter element changing station, that is as minimal as possible, also ensures that as little air as possible reaches the melt.

The invention will be described using the drawings.

Figure 2:
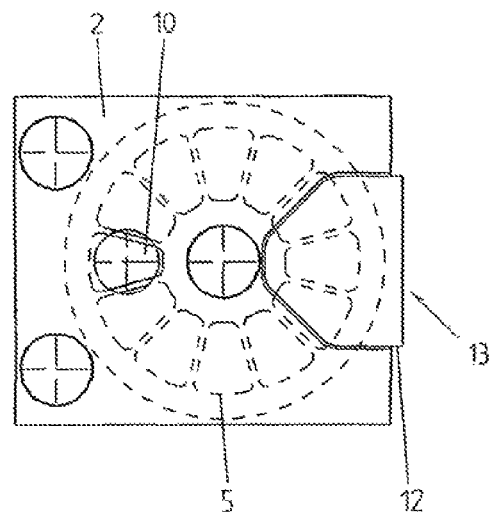
Figure 3:
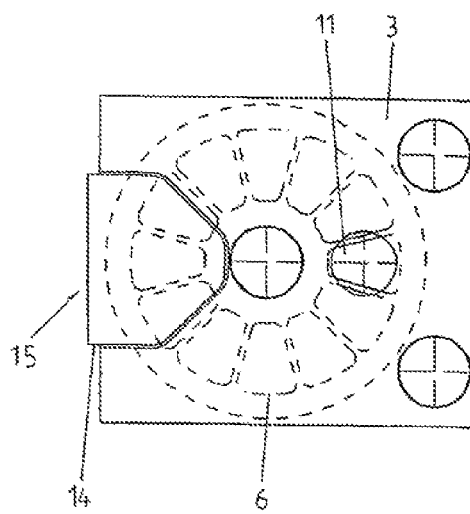

FIG. 1 shows a section through a filter element in accordance with the invention, whereas FIG. 2 shows view A, and FIG. 3 shows view B of the filter element.

FIG. 1 shows the housing 1 of a melt filter that is formed by an inlet block 2, an inlet block 3 as well as an outlet block 4 and a sieve disk 5 arranged between the inlet block 2 and the outlet block 4, as well as by a sieve disk 6 arranged between the inlet block 3 and the outlet block 4. The inlet block 2 forms a melt inlet 7 whereas the inlet block 3 forms a melt inlet 8. The outlet block 4 has a melt outlet 9. A melt conduit 10 extending from the melt inlet 7 to the sieve disk 5 widens toward the sieve disk 5 whereas the melt conduit 11 widens from the melt inlet 8 toward the sieve disk 6. The sieve disks 5 and 6 are arranged substantially parallel to one another and can be rotated by a preferably common ratchet drive (not shown).

FIG. 2 shows the inlet block 2 with the sieve disk 5 arranged behind it and the melt conduit 10. Furthermore, a filter element removal flap 12 can be seen that covers and closes a filter element changing station 13.

FIG. 3, on the other hand, shows the inlet block 3 with the sieve disk 6 arranged behind it and with the melt conduit 11 as well as the filter element removal flap 14 that covers and closes a filter element changing station 15.

The invention claimed is:

1. A melt filter for cleaning plastic melts discharged from extruders, with a housing comprising a melt conduit connecting a melt inlet and a melt outlet, the melt conduit holding a sieve disk that can be rotated by a motorized ratchet drive, the sieve disk being formed with an annular array of recesses separated by webs for receiving exchangeable filter sieves, the housing forming a filter element changing station wherein the housing has at least two melt inlets connected respective melt conduits to the melt outlet, and that a sieve disk that can be rotated by at least one motorized ratchet drive is provided in each melt conduit and that a filter element changing station is associated with each sieve disk.

2. The melt filter according to claim 1 wherein the housing has at least two inlet blocks and one outlet block and that a sieve disk is arranged each of the two inlet blocks and the outlet block and that the melt conduit widens from the melt inlet toward the sieve disk.

3. The melt filter according to claim 2 wherein the sieve disks are arranged in the housing substantially parallel to one another.

4. The melt filter according to claim 3 wherein the ratchets driving the sieve disks have a common ratchet drive.

5. The melt filter according to one of claims 1 to 4 wherein at least one backflow conduit is provided for each sieve disk in the outlet block, branched off from the outlet-melt conduit, and that backflow outlets located opposite each backflow conduit are provided in the inlet blocks.

6. The melt filter according to one of claims 1 to 5 wherein each inlet block completely covers the sieve disks bordering it and is interrupted only by the filter element changing station.

7. The melt filter according to claim 6 wherein each filter element changing station can be closed by a respective filter element removal flap.

8. The melt filter according to claim 6 or 7 wherein each filter element changing station larger than a single filter element and smaller than or the same size as two filter elements.

* * * * *